Nov. 3, 1959

S. B. KILNER 2,911,283

PROCESS FOR RECOVERY OF URANIUM VALUES
FROM IMPURE SOLUTIONS THEREOF

Original Filed Oct. 16, 1944

INVENTOR.
Scott B. Kilner
BY
ATTORNEY.

US United States Patent Office 2,911,283
Patented Nov. 3, 1959

2,911,283

PROCESS FOR RECOVERY OF URANIUM VALUES FROM IMPURE SOLUTIONS THEREOF

Scott B. Kilner, Oak Ridge, Tenn., assignor to the United States of America as represented by the United States Atomic Energy Commission Original application October 16, 1944, Serial No. 558,954. Divided and this application December 17, 1945, Serial No. 635,597

8 Claims.  (Cl. 23—14.5)

The present invention relates to processes of recovering uranium from a calutron and more particularly to improvements in certain steps of the process disclosed in the copending application of James M. Carter and Martin D. Kamen, Serial No. 532,159, filed April 21, 1944, which issued as Patent No. 2,758,006 on August 7, 1956. The present application is a division of copending application Serial No. 558,954, filed October 16, 1944, by Scott B. Kilner.

It is an object of the invention to provide an improved process of reclaiming uranium from a calutron.

Another object of the invention is to provide an improved process of recovering the residue of a uranium compound which has been subjected to treatment in a calutron from the parts of the calutron disposed in the source region thereof upon which the residue is deposited.

Another object of the invention is to provide an improved process of recovering metallic uranium enriched with $U^{235}$ from the collector of a calutron upon which the enriched metallic uranium is deposited.

A further object of the invention is to provide an improved process of purifying uranium which has been recovered from a calutron.

Another object of the invention is to provide a process of reclaiming uranium from a wash solution derived from a calutron, in which the uranium is precipitated as an insoluble uranium compound away from cyanide complex ions of metal impurities in the wash solution.

A still further object of the invention is to provide a process of reclaiming uranium from a wash solution derived from a calutron, in which the uranium is precipitated as an ammonium or alkali metal diuranate away from cyanide complex ions of metal impurities in the wash solution.

A still further object of the invention is to provide a process of reclaiming uranium from a wash solution derived from a calutron, in which the uranium is precipitated as uranous hydroxide away from cyanide complex ions of metal impurities in the wash solution.

The invention, both as to its organization and method of operation, together with further objects and advantages thereof, will best be understood by reference to the following specification taken in connection with the accompanying drawings in which.

At the outset, it is noted that a "calutron" is a machine of the character disclosed in the copending application of Ernest O. Lawrence, Serial No. 557,784, filed October 9, 1944, which issued as U.S. Patent No. 2,709,222 on May 22, 1955, and is employed to separate the constituent isotopes of an element and more particularly to increase the proportion of a selected isotope in an element containing a plurality of isotopes in order to produce the element enriched with the selected isotope. For example, the machine is especially useful in producing uranium enriched with $U^{235}$.

Such a calutron essentially comprises means for vaporizing a quantity of material containing an element which is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

More particularly in operating a calutron for the separation of uranium isotopes a volatile compound of uranium, e.g., $UCl_4$ is employed as the compound which is vaporized and ionized. These operations are conducted in the ion source of the calutron and, since only a fraction of the material is actually ionized and accelerated therefrom, a residual deposit of $UCl_4$ is produced on stainless steel surfaces in the source region. The accelerated ions of the uranium isotopes are separated by passage through the magnetic field of the calutron and, therefore, uranium enriched in isotopes $U^{235}$ and $U^{234}$ is deposited in the first pocket of the collector while uranium enriched in the isotope $U^{238}$ is deposited in the second pocket. Some uranium and chloride ions of different charge to mass ratios miss the collector and are deposited on various interior surfaces of the calutron.

Ordinarily, in plant operations, it is necessary to recycle the separated material to enhance the content of the desired isotope. However, since a large volume reduction has occurred, the plant requires only a small number of second-stage calutrons as compared to the number of first-stage machines; however, the separated materials become more valuable and it is highly desirable that the chemical separation processes are efficient and economical.

More particularly, in the cascaded plant arrangement, metallic uranium singly enriched with $U^{235}$ and deposited in the first pocket of the collector of the first-stage calutron is removed therefrom by an acid wash process, purified, converted to $UCl_4$ and reprocessed in a second-stage calutron. The residual deposit of $UCl_4$ is removed from the source region of the first-stage calutron by a water wash process, the solution combined with an acid wash solution obtained from the second pocket of a second-stage calutron, the composite solution is purified and the uranium is reprocessed in the first-stage calutron. The uranium doubly enriched in $U^{235}$, from the first pocket of the collector of the second-stage calutron, is recovered by an acid wash process, purified and converted to a standard compound for commercial use. The singly-enriched residual $UCl_4$ from the source region of the second-stage calutron is recovered by a water wash process, the solution combined with acid wash solution derived from the first pocket of the first-stage calutron collector, the composite solution is purified and the singly-enriched material is reprocessed in the second-stage calutron. Uranium which is unduly impoverished with reference to $U^{235}$ is recovered from various portions of the various calutrons and eliminated from the $U^{235}$ isotope enrichment cycle.

Figure 1:
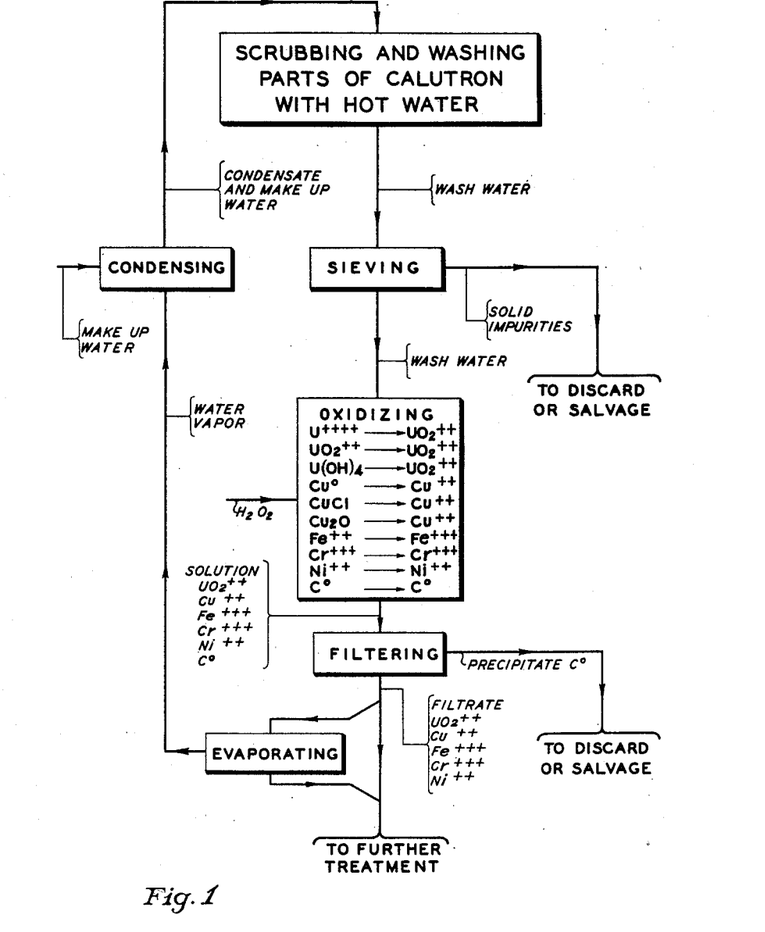
Figure 1 illustrates a portion of the flow diagram of the present process, indicating the recovery of the residue of $UCl_4$ from the parts of the calutron disposed in the source region thereof upon which it is deposited.

Considering now the details of the recovery of the $UCl_4$ residue from the parts of either a first-stage or a second-stage calutron disposed in the source region thereof, reference is made to the portion of the flow diagram illustrated in Fig. 1. The parts of the calutron disposed in the source region thereof, principally the source-region end of the liner, are scrubbed and washed with hot water, whereby the residue of $UCl_4$ deposited thereon is dissolved; and various impurities, including copper, iron, chromium, nickel and carbon, are introduced in the water wash, due to the fact that the various parts of the calutron which are thus washed with hot water are formed of the materials mentioned. The wash water is then sieved in order to remove any solid impurities which may be picked up, such, for example, as small pieces of metal and carbon. These solid impurities may be either discarded or subjected to salvage treatment in order to recover any occluded uranium. The sieved wash water is then treated with $H_2O_2$ by adding a slight excess of 10% $H_2O_2$ and agitating the solution in order to oxidize the various contained materials. For example, prior to the step of oxidation the wash water may contain suspended $U(OH)_4$ and bits of copper and carbon, together with dissolved uranium in the +4 and +6 valence states, as well as dissolved copper, iron, nickel, chromium and possibly other metals in one or more of the positive valence states. Hence, as a result of oxidation all of the uranium is put in solution as uranyl ions, suspended copper is put in solution as cupric ions, and other dissolved materials are put in their higher stable valence states, if they are not already in such state. Carbon is not oxidized by this treatment. The effect of the oxidation on the various materials contained in the wash solution may be indicated as follows:

Accordingly, the oxidized wash water contains at least the following: $UO_2^{++}$, $Cu^{++}$, $Fe^{+++}$, $Cr^{+++}$, $Ni^{++}$ and $C^0$ (carbon). The oxidized wash water is then filtered in order to remove $C^0$, which may be discarded or subjected to salvage treatment in order to recover any occluded uranium.

In the event this filtrate is rather dilute, it may be concentrated by evaporation; otherwise, this step is omitted. In the event the filtrate is concentrated by evaporaion, the water vapor which is driven off is condensed and to it is added enough makeup water in order to provide a new wash solution, which is used again to wash the parts of the calutron disposed in the source region thereof, in the manner previously explained. This step, comprising condensing and re-using the water vapor which is driven off the filtrate incident to concentration by evaporation, is advantageous in view of the fact that any uranium entrained in the water vapor is not lost to the outside. The original filtrate mentioned above, or the concentrated filtrate following evaporation, in the event this step is employed, is then stored for further treatment.

It will be understood that the stored water wash derived from the parts of the first-stage calutron disposed in the source region thereof, as explained above, comprises uranium of natural or normal composition with reference to $U^{235}$; while the stored water wash derived from the parts of the second-stage calutron disposed in the source region thereof, as explained above, comprises uranium which is singly enriched with $U^{235}$.

Figure 2:
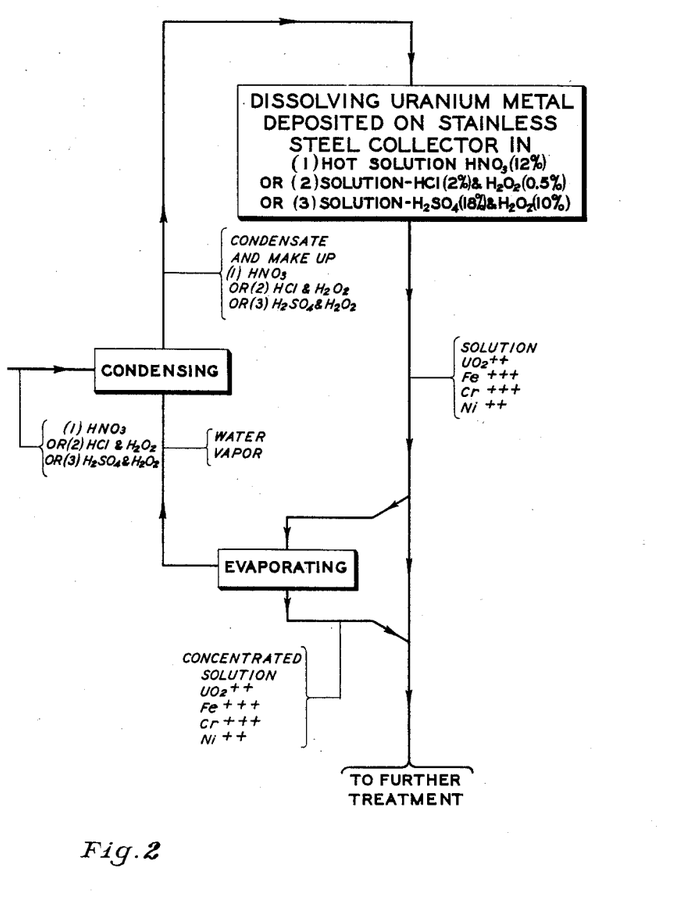
Fig. 2 illustrates another portion of the flow diagram of the present process, indicating the recovery of the metallic uranium from the collector of the calutron upon which it is deposited.

Considering now the details of the recovery of the metallic uranium, singly enriched with $U^{235}$, from the first pocket of the collector of the first-stage calutron, or of the metallic uranium, doubly enriched with $U^{235}$, from the first pocket of the collector of the second-stage calutron, reference is made to the portion of the flow diagram illustrated in Fig. 2. The inner surfaces of the first pocket of the collector of the calutron are etched with one of a number of acid solutions, whereby the deposit of metallic uranium, either singly or doubly enriched with $U^{235}$, is dissolved; and various impurities including iron, chromium and nickel are introduced in the acid wash solution, due to the fact that the inner surfaces of the first pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$, and $Ni^{++}$.

A suitable acid wash solution which may be employed for the purpose mentioned comprises an aqueous solution containing $HNO_3$ (approximately 12%). Another suitable acid wash solution comprises an aqueous solution containing $HCl$ (approximately 2%) and $H_2O_2$ (approximately 0.5%). A further suitable acid wash solution comprises an aqueous solution containing $H_2SO_4$ (approximately 18%) and $H_2O_2$ (approximately 10%). Thus, it will be understood that the first acid wash solution comprises an oxidizing acid, whereas the second and third acid wash solutions comprise a separate oxidizing agent in the form of $H_2O_2$. Hence, the acid wash solution employed in any case produces an oxidizing effect upon both the uranium and the metal impurities which are dissolved therein.

In the event the wash acid is rather dilute in the ions mentioned, it may be concentrated by evaporation; otherwise this step is omitted. In the event the wash acid is concentrated by evaporation, the vapor which is driven off is condensed and to it is added enough makeup $HNO_3$, or $HCl$ and $H_2O_2$, or $H_2SO_4$ and $H_2O_2$, depending upon the composition of the original wash acid employed, in order to provide a new wash acid which is again used to wash the first pocket of the collector of the calutron, in the manner previously explained. This step, comprising condensing the vapor which is driven off the wash acid incident to concentration by evaporation, is advantageous in view of the fact that any uranium entrained in the vapor is not lost to the outside. The original wash acid mentioned above, or the concentrated wash acid following evaporation, in the event this step is employed, is then stored for further treatment.

It will be understood that the stored acid wash derived from the first pocket of the collector of the first-stage calutron, as explained above, comprises uranium which is singly enriched with $U^{235}$; while the stored acid wash derived from the first pocket of the collector of the second-stage calutron, as explained above, comprises uranium which is doubly enriched with $U^{235}$.

The metallic uranium, impoverished with respect to $U^{235}$ and deposited in the second pocket of the collector of the first-stage calutron, may be recovered merely by etching the inner surfaces of the second pocket of this collector with a suitable wash acid of the character mentioned above, whereby this deposit of metallic uranium is dissolved. This acid wash is then discarded, as it contains so little $U^{235}$ that further processing thereof is not feasible.

On the other hand, the metallic uranium which has been first enriched with respect to $U^{235}$ and subsequently impoverished with respect to $U^{235}$, and deposited in the second pocket of the collector of the second-stage calutron, may be recovered by etching the inner surfaces of the second pocket of this collector with a suitable wash acid of the character mentioned above, whereby this deposit of metallic uranium is dissolved; and various impurities, including iron, chromium and nickel are introduced in the acid wash solution, due to the fact that the inner surfaces of the second pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$ and $Ni^{++}$. The considerations concerning whether the wash acid should be concentrated are the same as those previously noted. In any case, either the original wash acid mentioned above, or the concentrated wash acid following evaporation, in the event this step is employed, is then analyzed in order to determine the $U^{235}$ content thereof. In the event the analysis indicates that the $U^{235}$ content of this wash acid is at least as great as natural or normal uranium, it is stored for further treatment; on the other hand, in the event the analysis indicates that the $U^{235}$ content of this wash acid is less than that of natural or normal uranium, it is discarded, as further processing thereof is not feasible.

To the stored water wash solution derived from the parts of the first-stage calutron disposed in the source region thereof, there is added the stored acid wash solution derived from the second pocket of the collector of the second-stage calutron in order to produce a first composite solution; this first composite solution comprises uranium of substantially natural or normal composition with reference to $U^{235}$. Also, to the stored water wash solution derived from the parts of the second-stage calutron disposed in the source region thereof, there is added the stored acid wash solution derived from the first pocket of the collector of the first-stage calutron in order to produce a second composite solution; this second composite solution comprises uranium which is singly enriched with $U^{235}$. Finally, the stored acid wash solution derived from the first pocket of the collector of the second-stage calutron constitutes a third composite solution; this third composite solution comprises uranium which is doubly enriched with $U^{235}$.

Considering now the purification of one of the composite solutions, comprising the following ions: $UO_2^{++}$, $Fe^{+++}$, $Cr^{+++}$, $Ni^{++}$ and $Cu^{++}$, a number of different purification procedures are possible, as described in detail hereinafter. All of the procedures, however, are based upon the feature of separating uranium in one form or another from a solution in which the metal impurities are retained in the form of soluble cyanide complexes and in which the uranium is present in solution in either the +6 ($UO_2^{++}$) or the +4 ($U^{++++}$) oxidation state.

*Cyanide complexing applied to composite solutions containing uranium as $UO_2^{++}$*

A. Referring to the portion of the flow diagram illustrated in Fig. 3, the solution is subjected to a cyanide-hydroxide treatment, whereby cyanide complex ions of the metal impurities are produced and the uranium is precipitated as $(NH_4)_2U_2O_7$. More specifically, the treatment preferably comprises introducing an excess of HCN (either as a gas or a liquid) into the solution in an enclosed gas-tight vessel in order to complex the contained metal impurities, and then introducing sufficient ammonia (either in the form of carbonate-free $NH_3$ gas or as carbonate-free $NH_4OH$) into the solution while agitating, whereby the pH of the solution is rendered greater than about 13, and $(NH_4)_2U_2O_7$ is precipitated.

Figure 3:
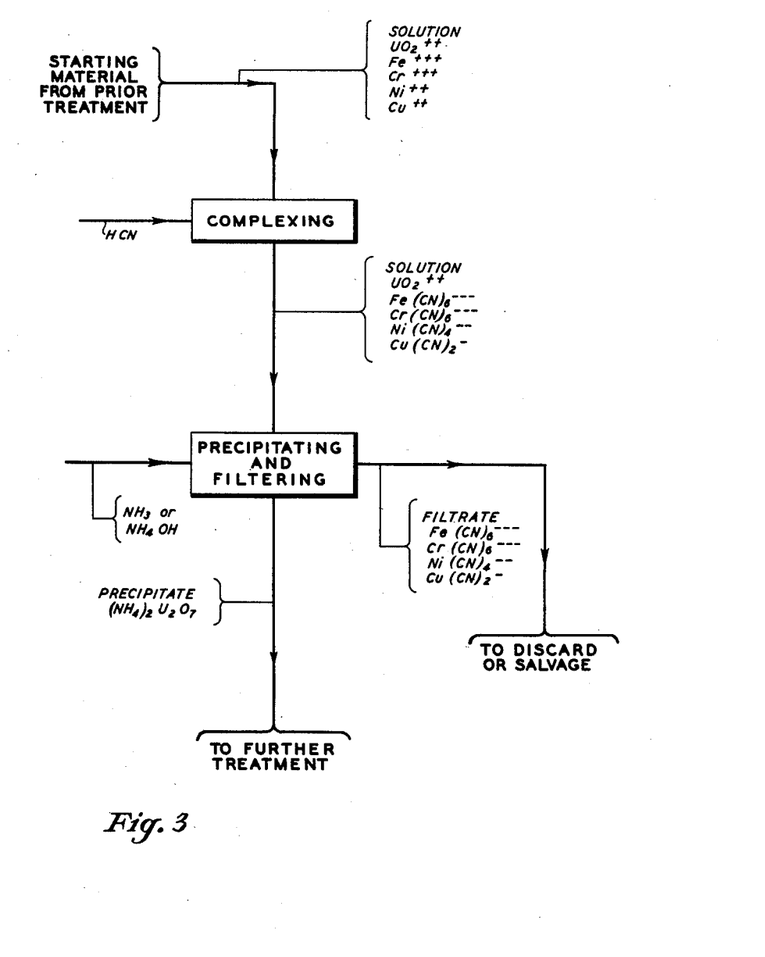
Figs. 3 to 8 illustrate further portions of the flow diagram of the present process, indicating various modifications in procedure for the purification of the recoverd uranium.

Thus, the following cyanide complex ions are produced in the solution:

$$Fe(CN)_6^{---}$$
$$Cr(CN)_6^{---}$$
$$Ni(CN)_4^{--}$$
$$Cu(CN)_2^{-}$$

This complexing of the iron and chromium impurities in the solution as ferricyanide ion and chromic cyanide complex ion prevents precipitation of the impurities mentioned when the solution is subsequently subjected to treatment with ammonia, and accordingly the uranium is precipitated as ammonium diuranate away from the metal impurities which are retained in solution.

The mixture is then filtered and the ammonium diuranate precipitate is washed with an aqueous solution containing about one percent $NH_4OH$ and one percent $NH_4NO_3$ in order to substantially eliminate occluded cyanide complex ions of the iron, chromium, nickel and copper. The filtrate containing the cyanide complex ions of iron, chromium, nickel, and copper is then discarded or subjected to salvage treatment in order to recover any uranium contained therein, and the purified $(NH_4)_2U_2O_7$ precipitate is stored for further treatment.

B. According to another modification, as illustrated in the portion of the flow diagram shown in Fig. 4, the metal impurities in the composite solution are complexed by treatment with HCN as already described in connection with Fig. 3. Thereafter, however, instead of treating with ammonia the solution containing the uranium in the form of uranyl ion, $UO_2^{++}$, and the metal impurities in the form of their respective cyanide complex ions, the solution is treated with a carbonate-free alkali metal hydroxide, such as KOH or NaOH, whereupon the uranium is precipitated as the corresponding alkali diuranate, $K_2U_2O_7$ or $Na_2U_2O_7$, the metal impurities that have been complexed by cyanide ion meanwhile remaining in solution.

Figure 4:
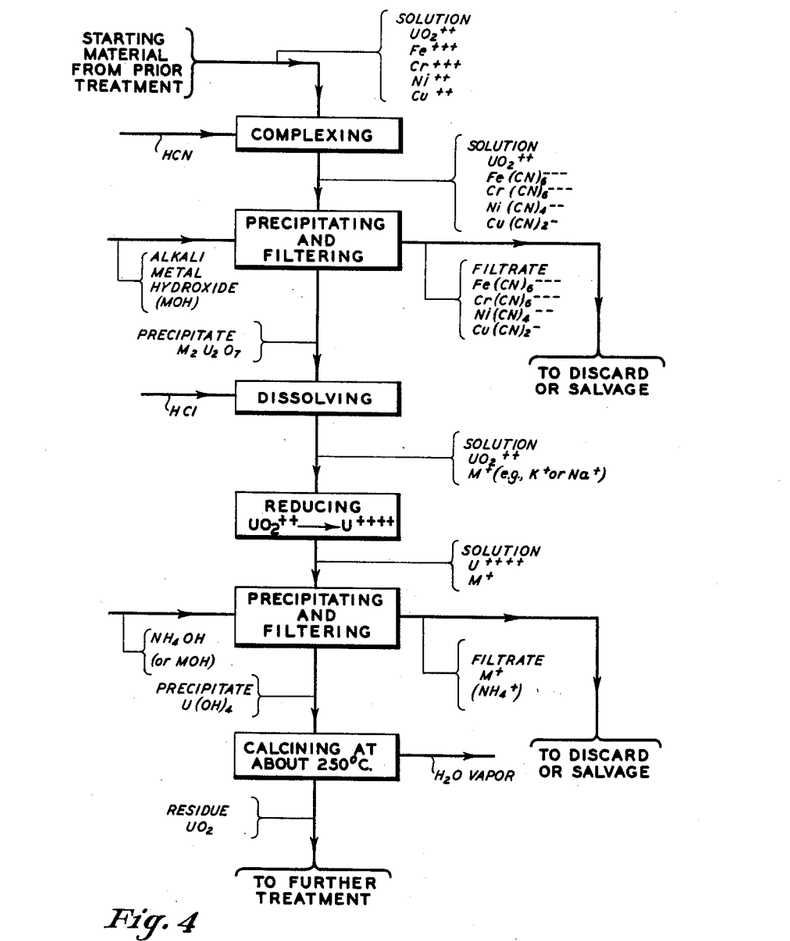

However, when the uranium is thus precipitated away from the metal impurities in the form of potassium or sodium diuranate instead of ammonium diuranate, a slight complication in the procedure is introduced in that this precipitate must be further treated in order to eliminate the potassium or sodium. In order to accomplish this end, as shown in Fig. 4 the $K_2U_2O_7$ or $Na_2U_2O_7$ precipitate is dissolved in an acid such as dilute HCl, resulting in a solution containing $UO_2^{++}$ and $K^+$ or $Na^+$ ions. The solution is then reduced in any suitable manner, whereby the uranium ion is reduced to its lower valence state, $U^{++++}$. For example, the solution may be electrolytically reduced in the manner disclosed in the copending application of Martin D. Kamen and Abel De Haan, Jr., Serial No. 542,378, filed June 27, 1944, which issued as Patent No. 2,771,340 on November 20, 1956.

The reduced solution now contains $U^{++++}$ and $K^+$ or $Na^+$ ions and is then treated with a carbonate-free ammonium or alkali metal hydroxide in order to precipitate the uranium as $U(OH)_4$ away from the potassium or sodium in the solution. Preferably carbonate-free ammonium hydroxide is employed for this step in order to avoid further increasing the concentration of alkali metal ion in the solution, since in the event of incomplete removal of occluded cationic material from the precipitated $U(OH)_4$, any ammonium ions that are retained thereon, unlike occluded alkali metal ions, are readily driven off and/or destroyed during the subsequent calcining step, thus promoting the recovery of pure uranium material. Following the addition of hydroxide to the solution, the resulting mixture is filtered and the uranium hydroxide precipitate is washed with an aqueous solution containing about one percent $NH_4OH$ and one percent $NH_4NO_3$, thus carrying any potassium or sodium ions that might be occluded thereon into the filtrate. The filtrate containing the $K^+$ or $Na^+$ ion is discarded or subjected to salvage treatment in order to recover any remaining traces of uranium that might be contained therein, and the $U(OH)_4$ is then calcined at approximately 250° C. in order to produce $UO_2$, water vapor being given off incident to the calcination. The $UO_2$ is then stored for further treatment or commercial use.

C. Instead of treating the composite solution with hydrogen cyanide and ammonia or alkali metal hydroxide in the manner described above, as illustrated in the portion of the flow diagram shown in Fig. 5 the solution may be first treated with a strong alkali metal cyanide, such as KCN or NaCN, in order to produce cyanide complex ions of the metal impurities without precipitation of the uranium, care being taken during this step to maintain the solution under conditions of sufficient acidity to prevent the hydroxides of the metal impurities from precipitating, such as by adding an acid such as HCl to the solution prior to adding all the alkali cyanide required for complete complexing of the metal impurities, or if some hydroxide precipitate is inadvertently formed, by adding an acid such as HCl to the solution to redissolve same prior to, or after, the required amount of alkali cyanide for complexing has been added.

Figure 5:
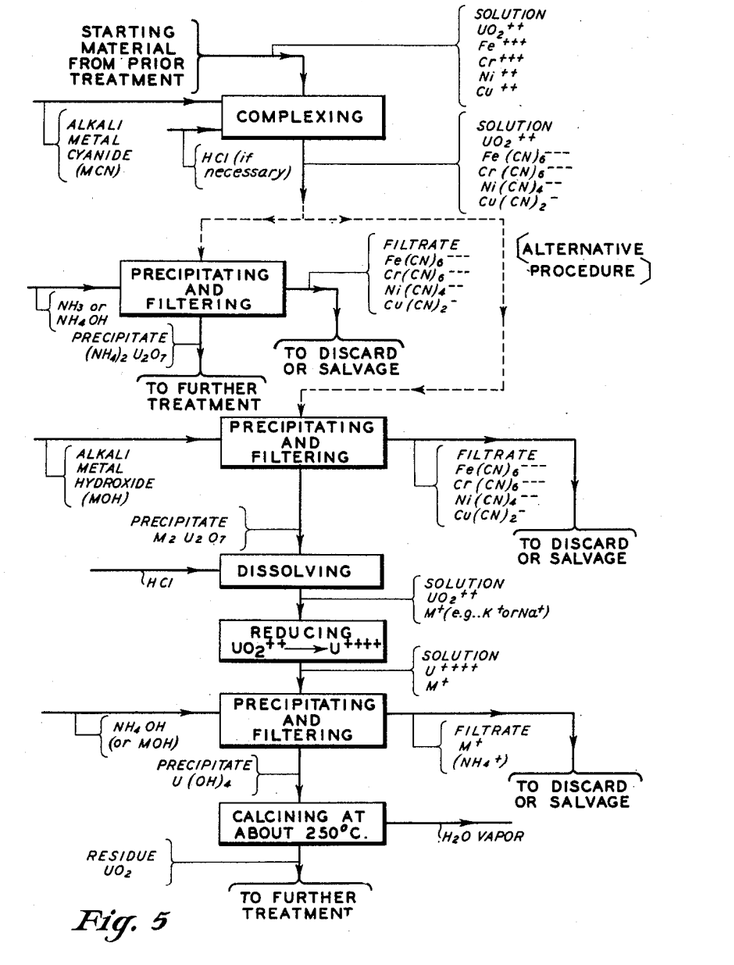

After the metal impurities have been complexed with the alkali cyanide, the solution is subsequently treated with ammonia (either in the form of carbonate-free $NH_3$ gas or carbonate-free $NH_4OH$) or with a carbonate-free alkali hydroxide such as KOH or NaOH, thereby precipitating the uranium as $(NH_4)_2U_2O_7$ or $K_2U_2O_7$ or $Na_2U_2O_7$, respectively, away from the metal impurities in the solution. The mixture is then filtered and the precipitate of ammonium, potassium or sodium diuranate is then washed, all in the manner previously explained.

When the uranium is precipitated as $(NH_4)_2U_2O_7$, this material may be stored for further treatment. When, however, the uranium is precipitated as $K_2U_2O_7$ or $Na_2U_2O_7$, it is preferably subjected to the treatment already described for the elimination of the potassium or sodium. Both alternatives are fully illustrated in Fig. 5, but since the respective procedures have already been described in detail in connection with Figs. 3 and 4, in the interests of brevity this need not be repeated.

*Cyanide complexing applied to composite solutions containing uranium as $U^{++++}$*

Figure 6:
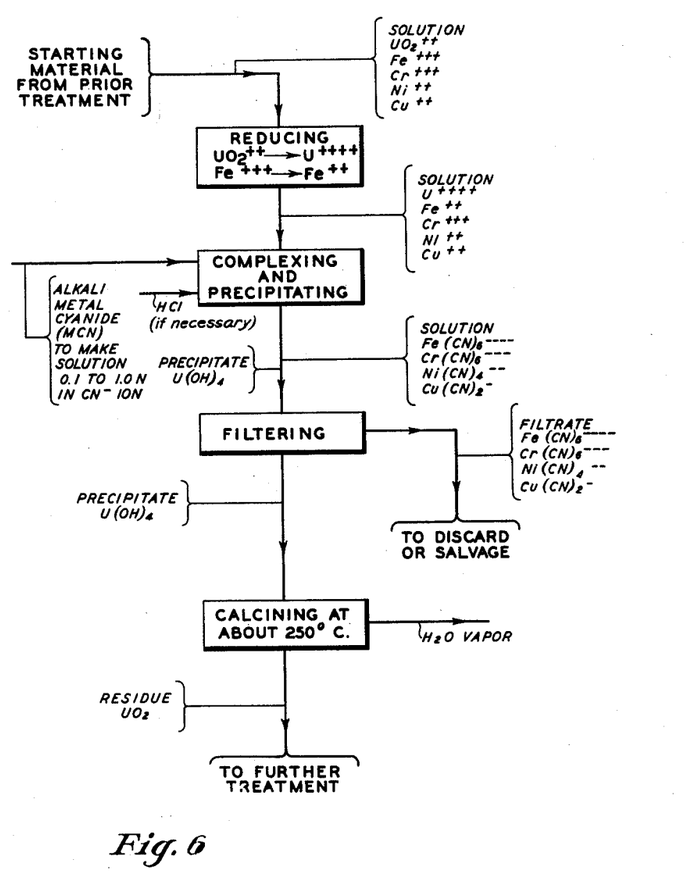

D. In accordance with a further modification in the present process of purifying the uranium, the uranium may be precipitated away from the metal impurities in the solution while the uranium is in a lower valence state, as illustrated in the portion of the flow diagram shown in Fig. 6. More particularly, the oxidized composite solution containing the uranium, iron, chromium, nickel and copper ions in their higher valence states is first reduced in any suitable manner. For example, the solution may be electrolytically reduced under controlled conditions in the manner disclosed in the previously mentioned copending application of Martin D. Kamen and Abel De Haan, Jr. In this case the effect of the reduction upon the various ions is as follows:

$$UO_2^{++} \rightarrow U^{++++}$$
$$Fe^{+++} \rightarrow Fe^{++}$$
$$Cr^{+++} \rightarrow Cr^{+++}$$
$$Ni^{++} \rightarrow Ni^{++}$$
$$Cu^{++} \rightarrow Cu^{++}$$

The reduced solution is then treated with solid alkali metal cyanide, such as KCN or NaCN, in amount sufficient to render the solution about 0.1 to 1.0 N in $CN^-$ ion, whereby cyanide complex ions of the metal impurities are produced and the uranium is simultaneously precipitated as $U(OH)_4$, some acid (such as HCl) preferably being added prior to the time complete complexing has been obtained, in order to maintain a sufficiently low pH to prevent premature formation of hydroxides of metal impurities which would interfere with the complexing mechanism. In this manner the following cyanide complex ions are produced in the solution:

This complexing of the iron and chromium impurities in the solution as ferrocyanide ion and chromic cyanide complex ion prevents precipitation of the impurities mentioned in the solution, and accordingly the uranium is precipitated as uranous hydroxide away from the metal impurities which are retained in solution.

The mixture is then filtered and the uranous hydroxide precipitate is washed with an aqueous solution containing about one percent $NH_4OH$ and one percent $NH_4NO_3$ in order to substantially eliminate occluded cyanide complex ions of the iron, chromium, nickel, and copper. The filtrate containing the cyanide complex ions of iron, chromium, nickel and copper is then discarded or subjected to salvage treatment in order to recover any remaining traces of uranium that might be contained therein, and the $U(OH)_4$ is then calcined at approximately 250° C. in order to produce $UO_2$, water vapor being given off incident to the calcination. The $UO_2$ is then stored for further treatment or commercial use, as previously noted.

Figure 7:
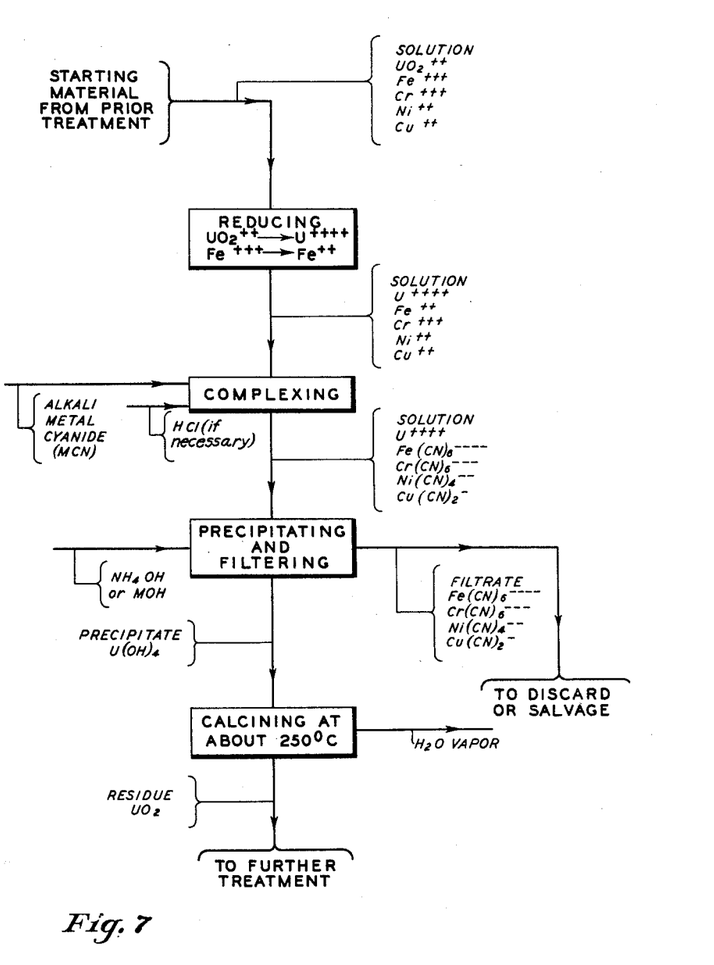

E. Alternatively, as illustrated in the portion of the flow diagram shown in Fig. 7, an alkali metal cyanide, such as KCN or NaCN, is added to the composite solution that has been previously reduced (for example, in the manner explained in connection with Fig. 6), in an amount sufficient only to complex the metal impurities (and preferably with the addition of an acid, such as HCl, to maintain a pH low enough to prevent premature precipitation of hydroxides of the metal impurities), followed by the addition of carbonate-free ammonia, either in the form of $NH_3$ gas or $NH_4OH$, or a carbonate-free alkali metal hydroxide, such as KOH or NaOH, to produce a precipitate of $U(OH)_4$ free of the metal impurities that are retained in soluble cyanide complex form in the solution. The subsequent separation of the precipitated $U(OH)_4$ and the conversion thereof to $UO_2$ are illustrated in Fig. 7 and for the sake of brevity, since these steps have already been described in detail, this description need not be repeated.

Figure 8:
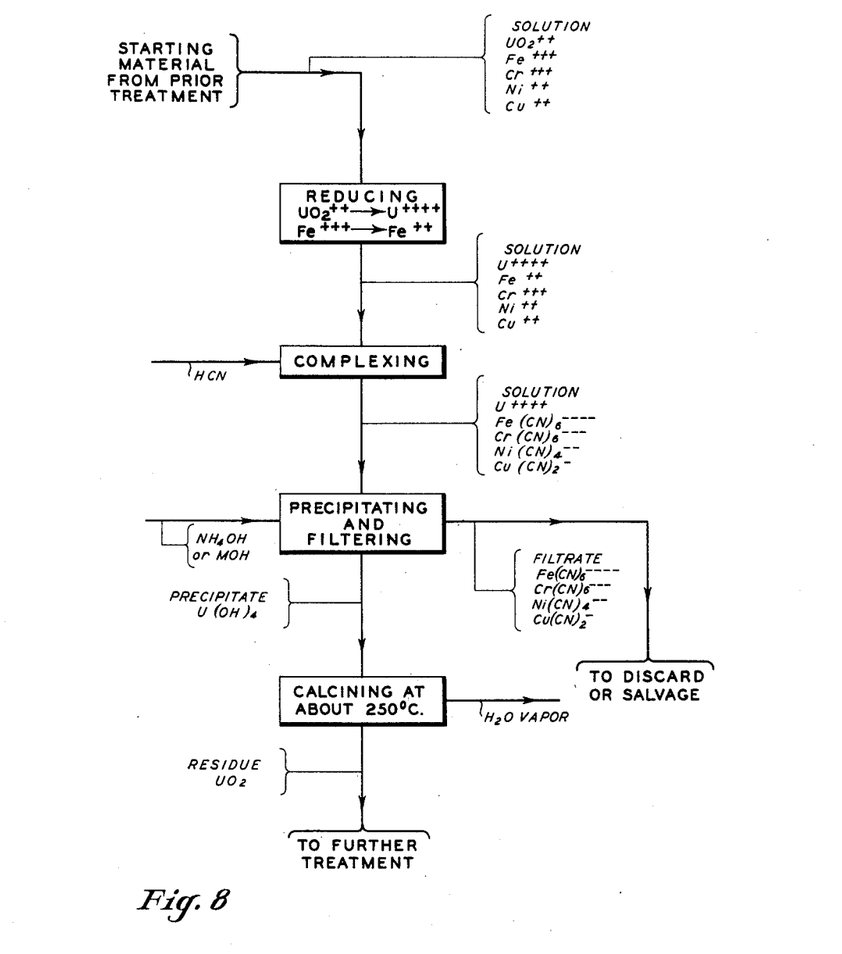

F. It is also possible to effect the separation of uranium from metal impurities contained in the composite solution as follows, with particular reference to the portion of the flow diagram illustrated in Fig. 8: The reduced composite solution, obtained as described above in connection with Fig. 6, is treated with HCN, either as a liquid or as a gas, in amount sufficient to complex the metal impurities, followed by the addition of carbonate-free ammonia, either as $NH_3$ gas or as $NH_4OH$, or a carbonate-free alkali metal hydroxide, such as KOH or NaOH, in an amount sufficient to precipitate $U(OH)_4$ free of the metal impurities that are retained in soluble cyanide complex form in the solution. The subsequent separation of the precipitated $U(OH)_4$ and the conversion thereof to $UO_2$ are shown in detail in Fig. 8, and for the sake of brevity, since these steps have already been described in connection with other figures, this description need not be repeated.

It will be understood that the purification of the first composite solution in accordance with any one of the procedures described above is productive of a first batch of $(NH_4)_2U_2O_7$ or $UO_2$ containing uranium of substantially natural or normal composition with reference to $U^{235}$. Also, the purification of the second composite solution in accordance with any one of the procedures described above is productive of a second batch of $(NH_4)_2U_2O_7$ or $UO_2$ containing uranium which is singly enriched with $U^{235}$. Finally, the purification of the third composite solution in accordance with any one of the procedures described above is productive of a third batch of $(NH_4)_2U_2O_7$ or $UO_2$ containing uranium which is doubly enriched with $U^{235}$. The first and second batches of $(NH_4)_2U_2O_7$ or $UO_2$ are then converted back to $UCl_4$ for re-treatment in the first-stage and second-stage calutrons, respectively; while the third batch of $(NH_4)_2U_2O_7$ or $UO_2$ is available for commercial use.

Figure 9:
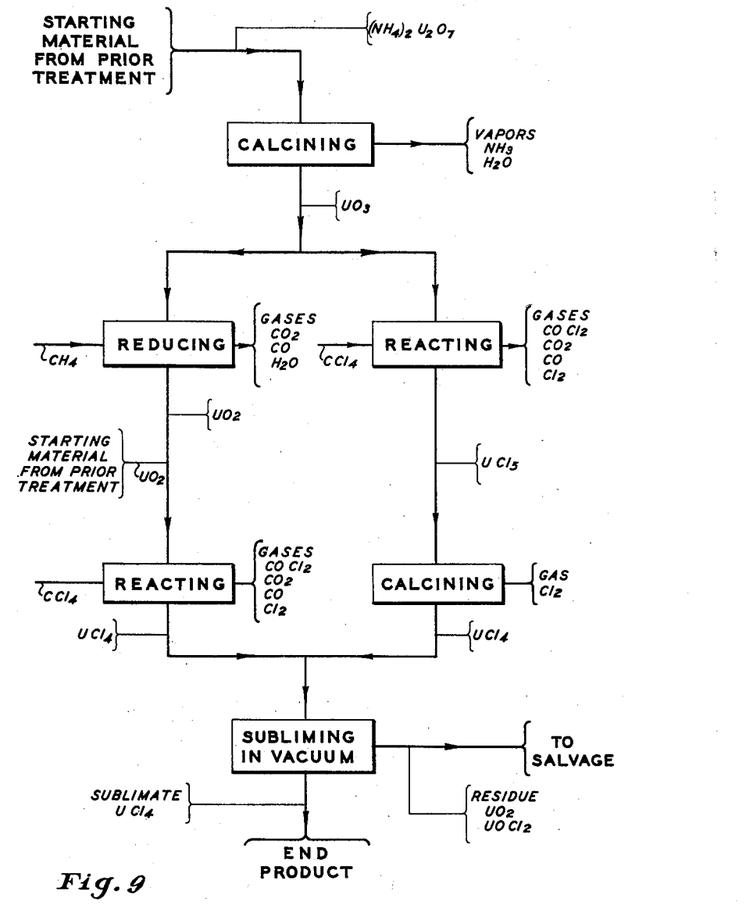
Fig. 9 illustrates a still further portion of the flow diagram of the present process, indicating the ultimate conversion of the purified uranium back to $UCl_4$.

Considering now the details of the ultimate conversion  of $(NH_4)_2U_2O_7$ to $UCl_4$, reference is made to the portion of the flow diagram illustrated in Fig. 9. More particularly, a batch of $(NH_4)_2U_2O_7$ is calcined at approximately 300° C. in order to produce $UO_3$, whereby $NH_3$ and water vapor are given off incident to the calcination. The uranium trioxide thus produced may be converted by alternative processes into crude $UCl_4$. In accordance with one process the $UO_3$ is first reduced to $UO_2$ by heating with $CH_4$ at approximately 450° C., whereby $CO_2$, CO and water gases are given off incident to the reduction. The uranium dioxide is then reacted with $CCl_4$ in the vapor phase at approximately 450° C. in a suitable reaction chamber in order to produce crude $UCl_4$, whereby $COCl_2$, $CO_2$, CO and $Cl_2$ gases are given off incident to the reaction. In accordance with an alternative process the $UO_3$ may be reacted directly with $CCl_4$ in the liquid phase in an autoclave at a temperature of approximately 140° to 160° C. and at a pressure of approximately 200 pounds per square inch gauge in order to produce $UCl_5$, whereby $COCl_2$, $CO_2$, CO and $Cl_2$ gases are given off incident to the reaction. The uranium pentachloride thus produced is then calcined or decomposed to produce crude $UCl_4$ by heating to approximately 350° C., whereby $Cl_2$ gas is given off incident to the calcination.

Of course, it will be understood that in the event the alternative procedure of purifying the uranium described above, wherein $UO_2$ is produced, is employed, the first batch or the second batch of $UO_2$ may be reacted directly with $CCl_4$ in the vapor phase, in order to produce crude $UCl_4$ in the manner described.

In any case, the crude uranium tetrachloride produced by either of the alternative processes indicated above is then sublimed in a suitable molecular still at approximately 600° C. in order to produce a sublimate of $UCl_4$, whereby residues of $UO_2$ and $UOCl_2$ are produced incident to the sublimation. The residues of $UO_2$ and $UOCl_2$ are ultimately converted to $UCl_4$. The $UCl_4$ thus produced is of very pure form and is suitable for recycling in the appropriate one of the first-stage or second-stage calutrons in the manner previously explained. More particularly, the conversion of the first batch of $(NH_4)_2U_2O_7$ or $UO_2$ is productive of a first batch of $UCl_4$ containing uranium of substantially natural or normal composition with reference to $U^{235}$; this batch of $UCl_4$ is recycled in the first-stage calutron. Also, the conversion of the second batch of $(NH_4)_2U_2O_7$ or $UO_2$ is productive of a second batch of $UCl_4$ containing uranium singly enriched with $U^{235}$; this second batch of $UCl_4$ is recycled in the second stage calutron.

The present process of recovering uranium from wash solutions derived from calutrons is very effective in view of the fact that it is quite versatile. Thus, not only may uranium be reclaimed from a wash solution containing the impurities mentioned, copper, iron, chromium and nickel, but the wash solution may contain a variety of other impurities, such as manganese, zinc, and silver, without adversely affecting the purification. Moreover, the purification can be carried out as explained without particular reference to the identification of the impurities or the proportions contained in the wash solution; this feature is very advantageous in view of the fact that both the particular impurities as well as the related quantities thereof vary considerably among the different wash solutions.

In view of the foregoing it is apparent that there has been provided an improved process of recovering, reclaiming, purifying and converting uranium, both in metallic and compound forms, in conjunction with the calutron method, whereby uranium enriched with $U^{235}$ may be produced on a large scale in commercial quantities.

Also, it will be understood that the present process may be suitably modified so that a compound of uranium other than $UCl_4$ may be treated either in the first-stage or in the second-stage calutron. For example, the calutron, as well as the conversion steps of the process, may be modified, whereby $UCl_6$, $UBr_4$, etc. may be treated in order to produce uranium enriched with $U^{235}$.

The term "uranium" is employed in the present specification and claims in a generic sense, i.e., as applying to uranium whether present in elemental, ionic, or compound form, unless indicated otherwise by the context. Furthermore, the terms "ammonia" and "ammonium hydroxide" are used interchangeably, so that the use of either term is to be construed as covering the use of both substances, unless the contrary is indicated by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a process for reclaiming uranium values from an acidic solution containing uranyl ions and impurity ions of metals of the group consisting of copper, iron, chromium, nickel, manganese, zinc and silver, the steps comprising reducing the uranyl ions in the solution to the uranous state, treating the reduced solution with a compound selected from the group consisting of hydrogen cyanide and alkali metal cyanides to complex the impurity ions in the solution while maintaining the pH of the solution at an acidic level sufficient to prevent the premature precipitation of impurity hydroxides therefrom, then treating the solution with a compound selected from the group consisting of ammonium hydroxide and alkali metal hydroxides to precipitate uranous hydroxide away from the complexed impurity ions in the solution, and separating the uranous hydroxide from the solution.

2. In a process for reclaiming uranium values including the production and treatment of an acidic solution containing uranous ions and impurity ions of metals of the group consisting of copper, iron, chromium, nickel, manganese, zinc and silver, the steps comprising treating said solution with a compound selected from the group consisting of hydrogen cyanide and alkali metal cyanides to complex the impurity ions in the solution while maintaining the pH of the solution at an acidic level sufficient to prevent precipitation of impurity hydroxides therefrom, then treating the solution with a compound selected from the group consisting of ammonium hydroxide and alkali metal hydroxides to precipitate uranous hydroxide away from the complexed impurity ions in the solution, and separating the uranous hydroxide from the solution.

3. The process of reclaiming uranium values from an acid solution containing uranyl ions and impurity ions of metals of the group consisting of copper, iron, chromium, nickel, manganese, zinc and silver, the steps comprising reducing the uranyl ions to the uranous state in the solution, acidifying said solution to prevent the precipitation of impurity metal hydroxides therefrom during a subsequent cyanide complexing step, treating the solution with an alkali metal cyanide to complex said metal impurity ions and then to precipitate uranous hydroxide away from the complexed impurity ions in the solution, and separating the uranous hydroxide from the solution.

4. The process of reclaiming uranium values from a solution containing uranyl ions and impurity ions of metals of the group consisting of copper, iron, chromium, nickel, manganese, zinc and silver, the steps comprising reducing the uranyl ions to the uranous state in the solution, acidifying the solution with mineral acid in order to prevent precipitation of said impurity ions as hydroxides during a cyanide treatment subsequent to said reduction, then treating the solution with an alkali metal cyanide to produce soluble cyanide complex ions of said impurities and to precipitate uranous hydroxide away from said complexed impurities in the solution, and separating said uranous hydroxide from the solution.

5. The process of reclaiming uranium values from a solution containing uranyl ions and impurity ions of metals of the group consisting of copper, iron, chromium, nickel, manganese, zinc and silver, the steps comprising reducing the uranyl ions to the uranous state in the solution, acidifying the solution with mineral acid in order to prevent precipitation of said impurity ions as hydroxides during a subsequent cyanide treatment, then treating the solution with an alkali metal cyanide to render the solution about 0.1 to 1 N in CN$^-$ ion thereby complexing the impurity ions in the solution, then treating the solution with a soluble hydroxide to precipitate uranous hydroxide away from the complexed impurity ions in the solution, and separating said uranous hydroxide from the solution.

6. In a process for reclaiming uranium values from a solution containing uranyl ions and impurity ions of metals of the group consisting of copper, iron, chromium, nickel, manganese, zinc and silver, the steps comprising reducing the uranyl ions in the solution to the uranous state, treating the reduced solution with hydrogen cyanide under pressure to complex the impurity ions, then treating the solution with a soluble hydroxide to precipitate uranous hydroxide away from the complexed impurities in the solution, and separating said uranous hydroxide from the solution.

7. The process as defined in claim 6, wherein the soluble hydroxide which is employed to precipitate said uranous hydroxide comprises ammonium hydroxide.

8. In a process for reclaiming uranium values from a solution also containing impurity ions of metals of the group consisting of copper, iron, chromium, nickel, manganese, zinc and silver, including the steps of complexing the impurity ions with cyanide and precipitating uranous hydroxide away from the impurities, the step comprising acidifying said solution with a mineral acid prior to the complexing step in order to prevent the precipitation of impurity hydroxides during said precipitation of uranous hydroxide.

References Cited in the file of this patent

Williams: Cyanogen Compounds, page 84 (1915). Published by J. & A. Churchill, London.

Friend: Textbook of Inorganic Chemistry, vol. VII, part III, page 335 (1926).